United States Patent
Lin et al.

(10) Patent No.: US 9,497,402 B2
(45) Date of Patent: Nov. 15, 2016

(54) IMAGE LAG MITIGATION FOR BUFFERED DIRECT INJECTION READOUT WITH CURRENT MIRROR

(71) Applicant: Sensors Unlimited, Inc., Princeton, NJ (US)

(72) Inventors: Minlong Lin, Plainsboro, NJ (US); Joshua Lund, Dallas, TX (US)

(73) Assignee: Sensors Unlimited, Inc., Princeton, NJ (US)

( * ) Notice: Subject to any disclaimer, the term of this patent is extended or adjusted under 35 U.S.C. 154(b) by 11 days.

(21) Appl. No.: 14/673,455

(22) Filed: Mar. 30, 2015

(65) Prior Publication Data

US 2016/0295146 A1    Oct. 6, 2016

(51) Int. Cl.
| | |
|---|---|
| H01L 31/00 | (2006.01) |
| H04N 5/3745 | (2011.01) |
| H04N 5/378 | (2011.01) |
| H04N 5/33 | (2006.01) |

(52) U.S. Cl.
CPC ............ *H04N 5/3745* (2013.01); *H04N 5/33* (2013.01); *H04N 5/378* (2013.01)

(58) Field of Classification Search
CPC ............... H01L 27/14649; H03F 2200/78; H04N 5/33; H04N 5/378; H04N 5/374; H04N 5/3745
USPC ........................................................ 250/330
See application file for complete search history.

(56) References Cited

U.S. PATENT DOCUMENTS

| | | | | |
|---|---|---|---|---|
| 5,382,977 A * | 1/1995 | Kozlowski | ............... | H04N 5/33 348/216.1 |
| 5,488,415 A | 1/1996 | Uno | | |
| 5,619,262 A * | 4/1997 | Uno | ............... | H04N 5/2352 348/297 |
| 6,373,050 B1 * | 4/2002 | Pain | ............... | G01J 1/16 250/252.1 |
| 6,384,413 B1 * | 5/2002 | Pain | ............... | G01J 1/46 250/330 |
| 9,191,586 B2 * | 11/2015 | Minlong | ............... | H04N 5/33 |
| 2002/0093472 A1 * | 7/2002 | Numao | ............... | G09G 3/3258 345/87 |
| 2005/0174612 A1 * | 8/2005 | Sugiyama | ............... | H04N 5/335 358/482 |
| 2006/0220161 A1 * | 10/2006 | Saito | ............... | G11C 11/16 257/421 |
| 2010/0226495 A1 * | 9/2010 | Kelly | ............... | G11B 20/00086 380/30 |
| 2013/0070134 A1 * | 3/2013 | Fowler | ............... | H04N 5/3745 348/300 |

(Continued)

OTHER PUBLICATIONS

Extended European Search Report for European Patent Application No. 16162881.3, dated Jun. 8, 2016.

*Primary Examiner* — David J Makiya
*Assistant Examiner* — Taeho Jo
(74) *Attorney, Agent, or Firm* — Locke Lord LLP; Scott D. Wofsy; Joshua L. Jones

(57) ABSTRACT

A circuit having a buffered direct injection (BDI) module is provided for image lag mitigation. The BDI module includes an optical detector coupled to a buffer. The buffer has a pixel amplifier which includes no more than two transistors. The BDI module includes a first current mirror coupled to the BDI module. The first current mirror generates a modulating current based on the output of the optical detector. The BDI module further includes a second current mirror coupled to the first current mirror. The second current mirror is configured to generate either an amplified or attenuated photocurrent operable to optimize an imaging time and scene brightness of the optical detector. The BDI module further includes a reset circuit, coupled to the second current mirror, and being configured to reset an integration capacitor which integrates an image signal based on the output of the optical detector.

15 Claims, 3 Drawing Sheets

(56) References Cited

U.S. PATENT DOCUMENTS

| | | | |
|---|---|---|---|
| 2013/0207960 A1* | 8/2013 | Arques | H04N 5/3658 345/212 |
| 2013/0223132 A1* | 8/2013 | Perner | G11C 13/0007 365/148 |
| 2014/0153318 A1* | 6/2014 | Perner | G11C 7/02 365/148 |
| 2014/0340154 A1* | 11/2014 | Lin | H03F 3/345 330/288 |
| 2015/0009337 A1* | 1/2015 | Minlong | H04N 5/33 348/166 |

* cited by examiner

IMAGE LAG MITIGATION FOR BUFFERED DIRECT INJECTION READOUT WITH CURRENT MIRROR

BACKGROUND OF THE INVENTION

1. Field of the Invention

The present disclosure relates to image sensor circuitry, and more particularly, to a buffered direct injection pixel circuit with a current mirror.

2. Description of the Related Art

In the field of optical sensors, the use of optical sensors to detect images in the infrared (IR) and other spectra has been known. Optical detectors such as InGaAs (Indium Gallium Arsenide) or other sensors in the IR band and other frequencies have been deployed in a focal plane with silicon readout circuits. Typically, the current output from the detector device has been delivered to an integration capacitor through an injection MOSFET which, in turn, is gated by a buffer to reduce the detector reverse-bias variations which arise due to photocurrent variations. This configuration is referred to as a buffered direct injection (BDI) readout circuit. A BDI circuit configuration according to known implementations is shown in FIG. 1.

The output from the BDI portion of those implementations can be delivered to a current mirror, as also shown in FIG. 1. The current mirror is used to either amplify or attenuate the input photocurrents in order to detect daylight-to-starlight scenes. By varying the voltage differences between BIAS and GAIN in FIG. 1, the ratio between $I_{out}$ and $I_{in}$ in FIG. 1 can vary by several orders of magnitude. The right-hand portion of the network is used to reset an integration capacitor used to control the timing of the light-gathering interval performed by the BDI or other readout circuits.

However, in BDI implementations such as that shown in FIG. 1, there are potential difficulties in the performance of the optical sensing and output generated by the BDI and current mirror circuits. Operating characteristics of the current mirror portion of the circuit, when driven by the buffered current generated by the BDI portion of the circuit, can cause a delay in the settling time of the scene being imaged, particularly when there is a large change in the amount of luminance in the scene.

Thus, there is a need for a pixel readout circuit with improved architecture having characteristics that are better optimized for use in an IR FPA.

SUMMARY OF THE INVENTION

A circuit includes a buffered direct injection (BDI) module. The BDI module includes an optical detector and a buffer connected to an output of the optical detector having a pixel amplifier. The pixel amplifier has no more than two transistors.

The BDI module includes a first current mirror coupled to the BDI module. The first current mirror generates a modulating current based on the output of the optical detector. The BDI module further includes a second current mirror coupled to the first current mirror. The second current mirror is configured to generate either an amplified or attenuated photocurrent operable to optimize an imaging time and scene brightness of the optical detector. The BDI module further includes a reset circuit, coupled to the second current mirror, and being configured to reset an integration capacitor which integrates an image signal based on the output of the optical detector.

In embodiments, the detector includes an infrared detector. The infrared detector can be configured to detect images in the infrared frequency range. The first current mirror can include a Sackinger current mirror. Each of the first current mirror and the second current mirror can include a pair of coupled transistors. The first current mirror and the second current mirror can share at least one transistor.

The second current mirror can include at least one output transistor to output the image signal. The first current mirror can generate an increase in modulation of the modulated current via negative feedback. The reset circuit can include a switching transistor coupled to the second current mirror.

The buffer can further include a direct injection transistor. The direct injection transistor can be a PMOS transistor and the two transistors of the pixel amplifier can include an NMOS transistor and a PMOS transistor. The buffer can further include a direct injection transistor. The direct injection transistor can be an NMOS transistor and the two transistors of the pixel amplifier include an NMOS transistor and a PMOS transistor. The pixel amplifier can consume less than about 1 nA of current. The pixel amplifier can include a first bias transistor connected to ground and a second bias transistor connected to a power supply.

In an aspect of the disclosure, an imaging system includes a focal plane array of buffered direct injection (BDI)-driven optical detector elements. Each BDI-driven optical detector element includes a buffered direct injection (BDI) module. The BDI module includes the optical detector, the buffer, the first current mirror, the second current mirror, and the reset circuit. Each BDI-driven optical detector element is formed on a common substrate.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF EMBODIMENTS

Reference will now be made in detail to exemplary embodiments of the present disclosure, which are illustrated in the accompanying drawings. Where possible the same or similar reference numbers will be used throughout the drawings to refer to the same or like parts.

Figure 1:
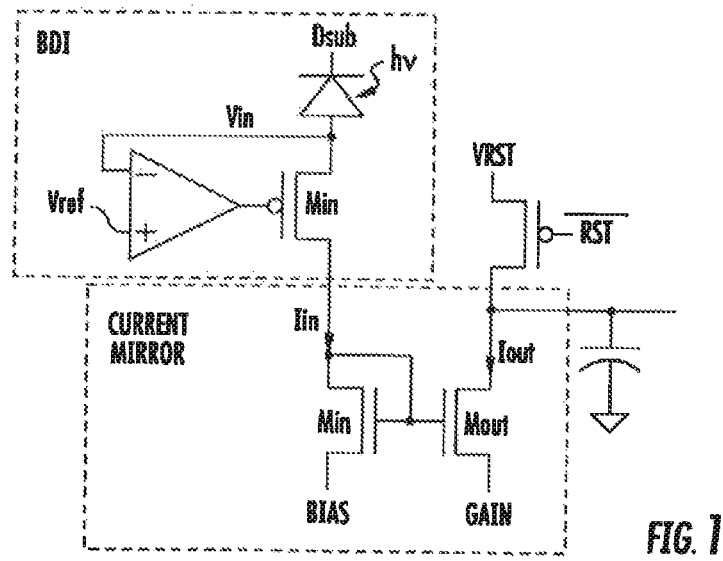
FIG. 1 illustrates optical detection systems which employ BDI circuitry.
Figure 2:
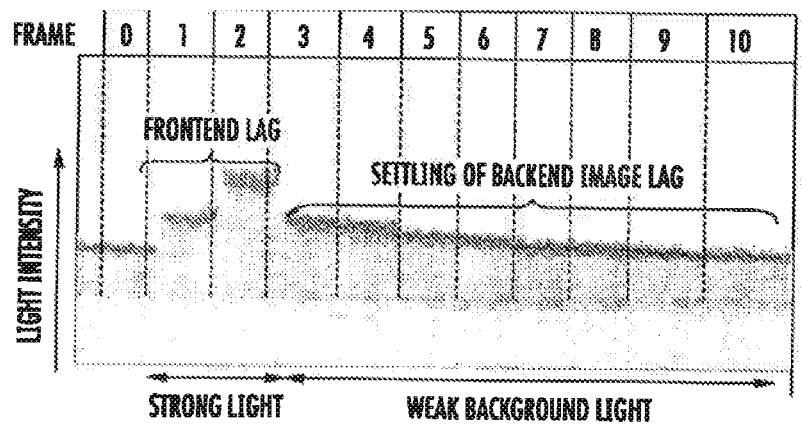
FIG. 2 illustrates signal response characteristics of optical detection systems shown in FIG. 1, in bright-to-dark transitional conditions.

FIG. 2 illustrates a delay in settling time when a BDI or other readout circuit is capturing an image with significant brightness variation in consecutive scenes. As shown, there is a limit on the time frame in which the readout circuit can respond to the scene brightness variations within a reasonable time frame. In FIG. 2, a bright scene occurs at frame 0, while at frame 1 the full brightness cannot be displayed. Rather, full brightness can only be displayed at frame 2. This is referred as "frontend" lag in FIG. 2. Then, at frame 2, the bright scene is switched to dark scene, and the display takes much longer time to settle to the dark scenes in an effect displayed in FIG. 2 as "backend" lag. During that type of flare or other transition, the sensor device may not be able to respond quickly enough to the rapid change in overall luminance of the scene to accurately generate output signal values. This image lag is, in part, caused by the charging/discharging of capacitance associated with the current mirror portion of the circuit in FIG. 1. The backend lag time constant, τ, can be estimated according to the expression:

$$\tau = RC$$

R is the effective impedance at the current mirror gate node and can be in the range of several hundreds of giga-Ω in a dark scene. A simple estimation of R can be related to the transconductance, $g_m$, of Min transistor in FIG. 1. $R \approx 1/g_m \approx (1.5*kT/q)/I_{in}$ where k is the Boltzmann constant, T is temperature, q is electron charge (1.6021765e-19) and $I_{in}$ is photocurrent. If T=300° K and photocurrent $I_{in}$=0.1 pA, R is almost 400 GΩ. C is the effective capacitance at the current mirror gate node.

As depicted in FIG. 2, when brightness variations include a transition from a bright scene to a dark scene, the time constant to settle the discharging of current mirror gate node can be many tens of milli-seconds. Since the typical frame time is 33 mS, backend image lag can last for several frames under transitional luminance conditions, which can significantly affect image quality or accuracy.

It may be desirable to provide methods and systems for image lag mitigation for buffered direct injection readout circuitry with a current mirror, in which optical sensors can deliver image signals via a BDI portion, which in turn feeds a current mirror topology that provides improved response time for changing image conditions.

Unfortunately, IR focal plane arrays and multiplexing readout circuits have design constraints that limit the amount of space or "real estate" that is typically available on a signal processing chip. In the readout portion of an FPA, the input amplifier cell circuitry that couples each photo detector to the corresponding readout site must perform several functions that are difficult to incorporate simultaneously due to the space constraints. In particular, a photo detector and amplifier cell of an FPA should ideally include: a detector interface stage that has low input impedance at a uniform operating bias; a large charge handling integration capacitor; a stage for uniform suppression of the background if integration capacitance time is long; low power pixel multiplexing and reset stages; and an output stage adequate to drive bus line capacitance for subsequent multiplexing at video rates.

Prior art IR FPAs typically lack impedance buffering, which forces a variation in detector dark currents and an increase in fixed pattern noise (i.e., spatial noise remaining after application of conventional two-point non-uniformity correction). Fixed pattern noise creates a visible mask in the imagery that obscures low contrast, high frequency information, thus degrading the minimum resolvable temperature and compromising performance under adverse conditions. Moreover, prior art devices lack capability for reducing pixel pitch and increasing pixel density. If the pixel pitch and photo detector and amplifier cell real estate are reduced in prior art devices, performance limitations are further aggravated. When pixel pitch continues to decrease, issues of power and noise become even more formidable.

Given the current state-of-the-art and the limited chip area available, there is insufficient photo detector and amplifier cell real estate for a readout circuit using a conventional architecture to integrate all of the most important features such as low input impedance, uniform detector bias, and satisfactory charge storage capacity. However, because small cells are necessary for FPAs with high pixel counts, integrated readout circuits with reasonable die sizes, and compact optics, all the important functions of the readout circuit must be integrated in as little cell real estate as possible. Inclusion of components for lag mitigation would consume additional space, further challenging space limitations.

Embodiments of the present disclosure relate to systems and methods for image lag and noise mitigation and reduced "real estate" and power consumption for buffered direct injection circuitry with current mirror. More particularly, embodiments relate to a compact optical detection system for collecting the signals generated by optical sensors from an InGaAs or other sensor array, while reducing the lag time required for the output of the sensors to settle when transitioning between a high-brightness scene and a low-brightness scene, or during other transitions in the imaging environment.

Figure 3:
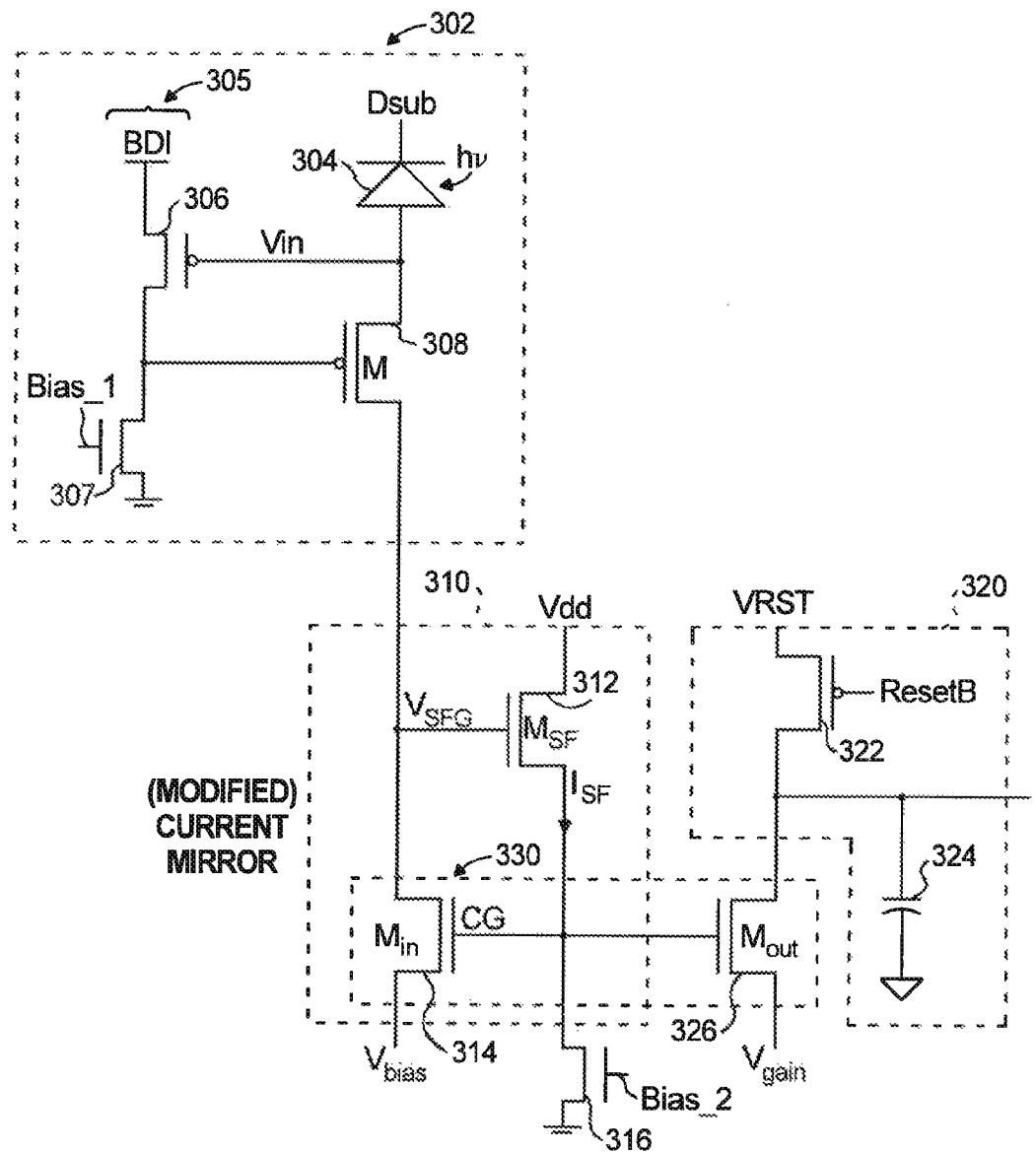
FIG. 3 illustrates an embodiment of an optical detection system incorporating BDI and current mirror circuitry, according to various aspects of the present disclosure.

FIG. 3 illustrates an embodiment of circuitry 300 in which systems and methods for image lag mitigation for buffered direct injection circuitry with a current mirror can operate. Circuitry is disclosed in U.S. Patent Application 2015/009337 that is related to buffered direct injection circuitry and in U.S. Patent Application 2014/0340154 that is related to image lag mitigation, both of which are incorporated herein by reference in their entirety. In aspects as shown in FIG. 3, circuitry 300 can include a BDI module 302. The BDI module 302 can include an optical detector 304, which can be or include an InGaAs detector or other optical sensing element that converts the input signal into an electrical signal.

In implementations, the optical detector 304 can be configured for enhanced low-level performance, for instance to be subjected to liquid cooling for lower noise and better low-light sensitivity. Light which impinges on the optical detector 304 can trigger current flow through a buffer section consisting of a transistor 308, coupled to a two-transistor pixel amplifier 305. An output signal Vin is output by optical detector 304 and provided to pixel amplifier 305 and transistor 308.

The transistor 308 can be a direct injection transistor that is linked to the optical detector 304 and reads the electrical signal output by the optical detector 304. In this embodiment, transistor 308 is a p-type MOSFET otherwise referred to as a PMOS transistor. The direct injection PMOS transistor 14 is coupled with the pixel amplifier 305.

The amplifier 305 includes two transistors, namely a first transistor 306 that is connected to a second transistor 307. The first transistor 306 can be linked to and read the electrical signal from the optical detector 304. In the embodiment illustrated, first transistor 306 is a p-type MOSFET otherwise referred to as a PMOS transistor. Vin can be applied to a gate node of the first transistor 306. First transistor 306 can further be connected to a power source.

The second transistor 307 can serve as a bias transistor for the pixel amplifier 305 and is connected to ground. In the embodiment illustrated, second transistor 307 is an NMOS transistor. A signal Bias_1 can be applied to a gate of the second transistor 307.

The pixel amplifier 305 replaces a five-transistor pixel amplifier used in prior art pixel cells. Consequently, the pixel amplifier 305 consumes a very small amount of current, for example, less than about 1 nA of current, as compared to about 50 nA-100 nA of current consumption by a five-transistor pixel amplifier for similar performance. The pixel amplifier 305, which includes only two transistors, is a single-ended amplifier that supplies a limited open-loop gain. Together with the negative feedback, pixel amplifier 305 can reduce the impedance at the gate node of first transistor 306; therefore, variation of voltage at the gate node of first transistor 306 is significantly reduced with large variation of photocurrent through transistor 308.

Figure 4:
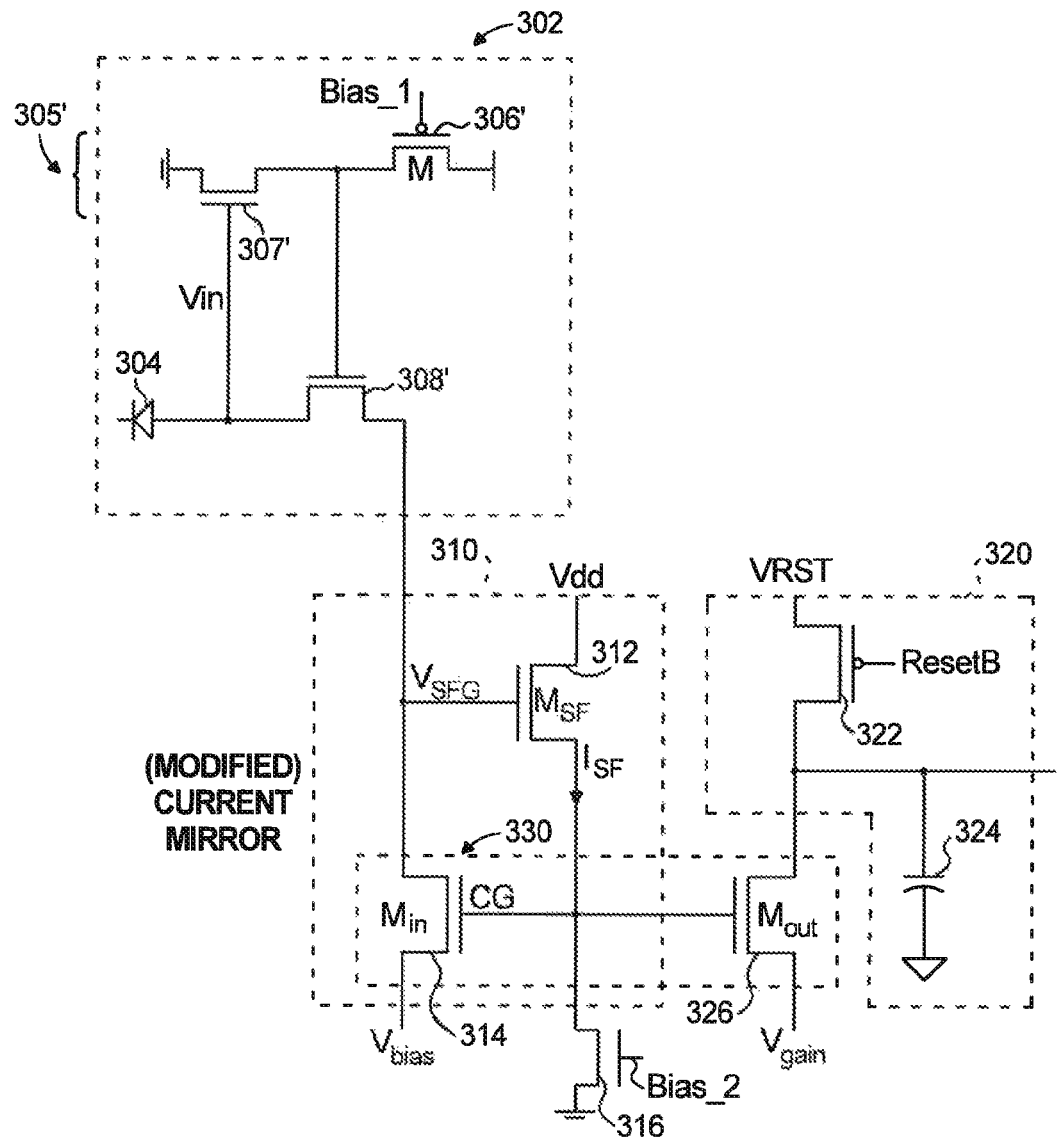
FIG. 4 illustrates another embodiment of an optical detection system incorporating BDI and current mirror circuitry, according to various aspects of the present disclosure.

Referring to FIG. 4, there is illustrated another BDI module 302'. The BDI module 302' includes optical detector 304, which is coupled to a buffer section that includes transistor 308' coupled to a pixel amplifier 305'. Output signal Vin is output by optical detector 304 and provided to pixel amplifier 305' and transistor 308'.

The transistor 308' can be a direct injection transistor that is linked to the optical detector 304 and reads the electrical signal output by the optical detector 304. In this embodiment, transistor 308 is an n-type MOSFET otherwise referred to as an NMOS transistor. The direct injection NMOS transistor 308 is coupled with the pixel amplifier 305'.

The amplifier 305' includes transistors 306' and 307'. In the embodiment illustrated, first transistor 306' is a PMOS transistor. First transistor 306' can further be connected to a power source. A signal Bias_1 can be applied to a gate of the first transistor 306'.

The second transistor 307' can be linked to and read the electrical signal from the optical detector 304. Vin can be applied to a gate node of the second transistor 307'. The first transistor 306' can serve as a bias transistor that provides current for second transistor 307' to function, and is connected to ground. In the embodiment illustrated, second transistor 307' is a PMOS transistor.

The pixel amplifier 305' replaces a five-transistor pixel amplifier used in prior art pixel cells. Consequently, the pixel amplifier 305' consumes a very small amount of current.

With reference to FIGS. 3 and 4, the output provided by the BDI module 302 or 302' can be coupled to a first current mirror 310. The first current mirror 310 can contain elements configured to provide a current mirror function, particularly, a third transistor 312 (labeled $M_{SF}$) and a fourth transistor 314 (labeled $M_{in}$). According to implementations, the first current mirror 310 can be or include a Sackinger current mirror, which can operate or function as a reduced version of a regulated cascode current mirror.

In implementations as shown, the set of overall circuitry 300 can further include a second current mirror 330. The second current mirror 330 can include the fourth transistor 314, along with a sixth transistor 326 (labeled $M_{out}$). In addition, the set of overall circuitry 300 can include a reset switching module 320, which can operate to reset an integration capacitor 324 via a reset switch 322, in order to charge the integration capacitor 324 for a new frame or other imaging interval. First current mirror 310 and second current mirrors 330 can share fourth transistor 314.

The current $I_{SF}$ can drive the current output in both sides of the second current mirror 330, which in turn provides an amplified/attenuated photocurrent generated by the optical detector 304 by varying the voltage difference between Vbias and Vgain (e.g. as shown in FIG. 1 for BIAS and GAIN). The current entering transistor 326 reflects current transmitted through the first current mirror 310, and can be a fixed current value. According to aspects, the lag mitigation of the sensed image can be controlled by modulating current $I_{SF}$, rather than by modulating the value of the photocurrent produced by the optical detector 304. The current $I_{SF}$ can in contrast reflect a charge/discharge current from the gate nodes of both $M_{in}$ 314 and $M_{out}$ 326. Based on the variation of the voltage value $V_{SFG}$ in response to light brightness, the current $I_{SF}$ and the gate charge/discharge current of current mirror 310 modulate against each other with respect to the constant current supplied by transistor 316.

Current supplied by transistor 316 is substantially constant. However, current $I_{SF}$ varies when light intensity changes. The difference between transient $I_{SF}$ due to varying light intensity and the constant current supplied by transistor 316 can either deplete or replenish gate charges of transistor 314 and transistor 326. This fast depletion or replenishment of gate charges in transistor 314 and transistor 326 can reduce lag in both backend (in the case of charge depletion) and frontend (in the case of charge replenishment) cases.

When a bright scene is switched to a dark scene, a decrease of $V_{SFG}$ value can decrease $I_{SF}$, which, in turn, can increase the discharging current from gate nodes of both $M_{in}$ 314 and $M_{out}$ 326 since current Bias_2 is fixed. This accelerated discharging current from the gate nodes of both $M_{in}$ 314 and $M_{out}$ 326 has the effect of reducing backend lag.

According to aspects, the same principle applies to the mitigation of front-end lag. According to aspects, negative feedback provided by the first current mirror 310 can increase the modulation of transistor 312 by a gain factor of $(g_{m\text{-}Min})/(g_{ds\text{-}Min})$, wherein $(g_{m\text{-}Min})$ is transconductance of transistor 314, and $(g_{ds\text{-}Min})$ is conductance of transistor 314. For example, if voltage $V_{SFG}$ at the drain node of transistor 314 increases, a voltage CG at the source node of transistor 312 can increase too. When voltage CG increases, voltage $V_{SFG}$ can decrease. This negative feedback can forestall a continuing increase of voltage $V_{SFG}$ and stabilize voltage $V_{SFG}$, thus modulating transistor 312. The purpose of transistor 312 is to suppress transience when light intensity varies. Modulation of transistor 312 beneficially accelerates suppression of this transience.

This gain factor can reduce the image lag produced by the BDI module 302 and following current mirror circuitry relative to the lag experienced by known BDI-driven readout circuitry with current mirror. Faster, less noisy, and/or more accurate imaging in the IR or other bands can therefore be achieved.

It may be noted that the set of overall circuitry 300 including the BDI 302, the first current mirror 310, the second current mirror 330, and the reset switching module 320 can be implemented as the detector element for a single pixel in a focal plane array. A large number of those pixel elements can be fabricated using large scale integration (LSI) to form an integrated sensing unit that can image a large number of combined pixels, each of whose output is regulated using circuits and techniques disclosed herein. The aggregate sensing unit can, again, be configured to capture images in the IR band, and/or other frequency ranges.

In both embodiments of the subject disclosure, the BDI pixel circuit of the subject disclosure includes a total of seven transistors, resulting in a circuit architecture of reduced size covering less "real estate", as compared to prior art direct injection pixel circuits having a five transistor pixel amplifier.

Furthermore, the BDI pixel cell of the subject disclosure consumes less than 1% of the power consumed by a pixel cell constructed with a conventional five transistor pixel amplifier. So a much larger pixel array can be constructed using the BDI pixels of the subject disclosure. There is also lower noise generated by the BDI pixels of the subject disclosure, as compared to conventional BDI pixel.

More particularly, with smaller pixel pitch, signal irradiance per pixel decreases and signal-to-noise ratio decreases accordingly. Indeed, fewer transistor count and low bias current in this embodiment contribute to lower noise than traditional readout designs.

In addition, the Sackinger current mirror provides much less variation in photo-diode reverse-bias by its intrinsic negative feedback. This is similar to a typical direct injection six-transistor pixel amplifier, but with much less real-estate, power and noise.

The foregoing description is illustrative, and variations in configuration and implementation may occur to persons skilled in the art. For example, while embodiments have been described in which a BDI module 302 is configured using two-transistor pixel amplifier 305, transistor 308, and optical detector 304 configured in a certain arrangement, in implementations, those elements can be configured in different topologies or arrangements, and/or can be substituted with other electrical elements. Similarly, while the first current mirror 310 and second current mirror 330 have been illustrated as being configured with certain transistor elements in illustrative arrangements, it will be appreciated that in implementations, those elements can also be configured in different topologies or arrangements, and/or substituted with other electrical elements. Other resources described as singular or integrated can in embodiments be plural or distributed.

The methods and systems of the present disclosure, as described above and shown in the drawings, provide for optical detector elements with superior properties including improved image quality. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A circuit, comprising: a buffered direct injection (BDI) module, the BDI module comprising:
   an optical detector;
   a buffer connected to an output of the optical detector having a pixel amplifier, the pixel amplifier having no more than two transistors;
   a first current mirror, coupled to the BDI module, the first current mirror generating a modulating current based on the output of the optical detector;
   a second current mirror, coupled to the first current mirror, the second current mirror being configured to generate either an amplified or attenuated photocurrent operable to optimize an imaging time and scene brightness of the optical detector; and
   a reset circuit, coupled to the second current mirror, and being configured to reset an integration capacitor which integrates an image signal based on the output of the optical detector.

2. The circuit of claim 1, wherein the optical detector comprises an infrared detector.

3. The circuit of claim 2, wherein the infrared detector is configured to detect images in the infrared frequency range.

4. The circuit of claim 1, wherein the first current mirror comprises a Sackinger current mirror.

5. The circuit of claim 1, wherein the each of the first current mirror and the second current mirror comprises a pair of coupled transistors.

6. The circuit of claim 1, wherein the first current mirror and the second current mirror share at least one transistor.

7. The circuit of claim 1, wherein the second current mirror comprises at least one output transistor to output the image signal.

8. The circuit of claim 1, wherein the first current mirror generates an increase in modulation of the modulated current via negative feedback.

9. The circuit of claim 1, wherein the reset circuit comprises a switching transistor coupled to the second current mirror.

10. The circuit of claim 1, wherein the buffer further includes a direct injection transistor, the direct injection transistor is a PMOS transistor and the two transistors of the pixel amplifier include an NMOS transistor and a PMOS transistor.

11. The circuit of claim 1, wherein the buffer further includes a direct injection transistor, the direct injection transistor is a NMOS transistor and the two transistors of the pixel amplifier include an NMOS transistor and a PMOS transistor.

12. The circuit of claim 1, wherein the pixel amplifier consumes less than about 1 nA of current.

13. The circuit of claim 1, wherein the pixel amplifier includes a first bias transistor connected to ground and a second bias transistor connected to a power supply.

14. An imaging system, comprising: a focal plane array of buffered direct injection (BDI)-driven optical detector elements, wherein each BDI-driven optical detector element comprises a buffered direct injection (BDI) module, the BDI module comprising:
   an optical detector;
   a buffer connected to an output of the optical detector having a pixel amplifier, the pixel amplifier having no more than two transistors;
   a first current mirror, coupled to the BDI module, the first current mirror generating a modulating current based on the output of the optical detector;
   a second current mirror, coupled to the first current mirror, the second current mirror being configured to generate either an amplified or attenuated photocurrent operable to optimize an imaging time and scene brightness of the optical detector; and
   a reset circuit, coupled to the second current mirror and being configured to reset an integration capacitor which integrates an image signal based on the output of the optical detector; wherein each BDI-driven optical detector element is formed on a common substrate.

15. The circuit of claim 14, wherein the pixel amplifier includes a first bias transistor connected to ground and a second bias transistor connected to a power supply.

* * * * *